US012276243B2

(12) United States Patent
Baumgaertner et al.

(10) Patent No.: US 12,276,243 B2
(45) Date of Patent: Apr. 15, 2025

(54) INJECTOR COMPONENT HAVING A COATING, INJECTOR, AS WELL AS A DEVICE FOR COATING

(71) Applicant: Robert Bosch GmbH, Stuttgart (DE)

(72) Inventors: Lutz Baumgaertner, Bietigheim-Bissingen (DE); Martin Roettgen, Stuttgart (DE); Martina Bubrin, Stuttgart (DE); Michael Lingner, Vaihingen/Enz (DE); Milan Pilaski, Mannheim (DE); Tim Bergmann, Hemer (DE); Thomas Felsch, Waiblingen-Hohenacker (DE)

(73) Assignee: ROBERT BOSCH GMBH, Stuttgart (DE)

( * ) Notice: Subject to any disclaimer, the term of this patent is extended or adjusted under 35 U.S.C. 154(b) by 716 days.

(21) Appl. No.: 17/305,429

(22) Filed: Jul. 7, 2021

(65) Prior Publication Data

US 2021/0332781 A1 Oct. 28, 2021

Related U.S. Application Data

(62) Division of application No. 16/462,446, filed as application No. PCT/EP2017/079865 on Nov. 21, 2017, now Pat. No. 11,401,901.

(30) Foreign Application Priority Data

Nov. 21, 2016 (DE) ..................... 10 2016 222 912.5

(51) Int. Cl.
*C25D 17/06* (2006.01)
*C25D 7/00* (2006.01)
(Continued)

(52) U.S. Cl.
CPC ........... *F02M 51/0671* (2013.01); *C25D 7/00* (2013.01); *C25D 17/06* (2013.01); *C25D 17/12* (2013.01);
(Continued)

(58) Field of Classification Search
None
See application file for complete search history.

(56) References Cited

U.S. PATENT DOCUMENTS 7,722,745 B2 * 5/2010 von Detten .......... C25D 17/004 204/224 R
2011/0155103 A1 6/2011 Abe et al.
(Continued)

FOREIGN PATENT DOCUMENTS

DE 19735244 A1 2/1999
DE 102009003072 A1 11/2010
(Continued)

OTHER PUBLICATIONS

English translation JP 2000-516303 (Year: 2000).*
International Search Report for PCT/EP2017/079865, Issued Jul. 24, 2018.

*Primary Examiner* — Stefanie S Wittenberg
(74) *Attorney, Agent, or Firm* — NORTON ROSE FULBRIGHT US LLP; Gerard A. Messina

(57) ABSTRACT

An injector component of an injector for introducing a fluid is described as including a base body, a coating on at least one first end face of the base body, the coating having a maximum, which lies on an outer half of the base body, and an outer lateral surface of the base body does not have any coating.

14 Claims, 5 Drawing Sheets

(51) Int. Cl.
*C25D 17/12* (2006.01)
*F02M 51/06* (2006.01)
*C25D 5/02* (2006.01)

(52) U.S. Cl.
CPC ........... *C25D 5/02* (2013.01); *F02M 51/0685* (2013.01); *F02M 2200/9038* (2013.01)

(56) References Cited

U.S. PATENT DOCUMENTS

| | | | |
|---|---|---|---|
| 2012/0175260 | A1 | 7/2012 | Keller et al. |
| 2016/0230725 | A1 | 8/2016 | Katsumata |

FOREIGN PATENT DOCUMENTS

| | | | |
|---|---|---|---|
| EP | 0686710 | A2 | 12/1995 |
| EP | 1199465 | A2 | 4/2002 |
| GB | 2053967 | A | 2/1981 |
| JP | 2000265919 | A | 9/2000 |
| JP | 2005036696 | A | 2/2005 |
| JP | 2006266231 | A | 10/2006 |
| JP | 2010071123 | A | 4/2010 |
| JP | 2016048068 | A | 4/2016 |
| WO | 2015136974 | A1 | 9/2015 |
| WO | 2016050506 | A1 | 4/2016 |

* cited by examiner

INJECTOR COMPONENT HAVING A COATING, INJECTOR, AS WELL AS A DEVICE FOR COATING

CROSS-REFERENCE TO RELATED APPLICATIONS

The present application is a divisional application of U.S. patent application Ser. No. 16/462,446, filed May 20, 2019, which is a U.S. National Phase of International Application PCT/EP2017/079865, filed Nov. 21, 2017, and claims the benefit under 35 U.S.C. § 119 of German Patent Application No. DE 10 2016 222 912.5, filed on Nov. 21, 2016, all of which are hereby incorporated by reference in their entireties.

FIELD OF THE INVENTION

The present invention relates to an injector component of an injector for introducing a fluid, in particular an inner pole or an armature of an injector, to an injector having such an injector component, and a device for coating a component; in addition, it relates to a method for producing an injector component.

BACKGROUND INFORMATION

Injectors are known from the related art, for instance in the form of fuel injectors having different developments. It is known to coat the components in order to provide certain components with particular properties or to extend the service life of components. One possibility for coating, for instance, is galvanic coating, in particular chromium-plating, in which case the workpiece to be coated is connected to a cathode and an anode dispenses the coating material via an electrolyte. Known from the printed publication DE 10 2009 003 072 A1, for example, is a device for the simultaneous coating of a multitude of workpieces, in which a flow distribution device and a multitude of flow channels are provided, and an individual control of an electrolyte flow and an adjustment for each individual workpiece is possible. Inaccuracies occur, in particular in a transition zone between an uncoated region and the region to be coated, especially when high-volume components are involved. As a result, however, compliance with coating dimensions required for a component accuracy is not always possible.

SUMMARY

In contrast, the injector component of an injector according to the present invention for the introduction of a fluid, such as a fuel injector, having the features of Claim 1, has the advantage that the injector component includes a coating, which is provided on an end face of a base body, and the coating is restricted to the end face of the base body, without an outer lateral side of the injector component having a coating. This makes it possible to satisfy the highest demands with regard to an accuracy of the coating in the single μm range. The coating has a maximum at the end face, which lies at an outer half of the base body, and a lateral surface of the base body is without coating. The injector component thus has a locally provided and precisely limited coating.

The dependent claims show preferred further developments of the present invention.

The base body preferably has no coating at an outer edge of the end face. This ensures that coating of the outer lateral surface of the base body is prevented. More specifically, it is thereby ensured that an external dimension of the base body will not be changed by a coating. An annular edge region on the end face is preferably without coating.

It is furthermore preferred that the coating has a thickness of ≥6 μm at the maximum, in particular approximately 6.5 μm. In addition, the coating at the maximum amounts to less than 7 μm.

According to one further preferred development, the base body is annular and has a central feed-through opening. In a particularly preferred manner, the electro component is an inner pole of a solenoid actuator of the injector.

Preferably, the coating is provided at an inner edge of the annular base body in such a way that the coating has a thickness of ≥5 μm, in particular 5.5 μm. In addition, a slope of the coating starting from an inner edge to the maximum and/or a slope of the coating from the outer edge to the maximum is preferably rectilinear.

More specifically, due to the different thicknesses of the coating at the inner and outer edges, the slopes from the edges to the maximum are of different sizes.

In addition, an inner lateral surface in the feed-through opening of the base body is preferably at least partially coated as well. The coating on the inner lateral surface is preferably uniform.

According to a further preferred embodiment of the present invention, the feed-through opening on the side pointing to the coated end face has a tapered region at an inner side, in particular a conically tapering region. This tapered region is preferably coated as well.

In a particularly preferred manner, the coating is developed in symmetry with a center axis of the injector component.

The injector component is preferably an inner pole of a solenoid actuator. Alternatively, the injector component is an armature of a solenoid actuator.

In addition, the present invention relates to an injector having an injector component according to the present invention. In a particularly preferred manner, the injector is a fuel injector. When the injector component is preferably developed as an inner pole and/or an armature of a solenoid actuator of the injector, this particularly allows for a rapid actuation time of the injector. By developing the annular maximum on an outer half of the base body, an adhesion of the armature to the inner pole is significantly reduced.

Moreover, the present invention relates to a solenoid actuator, which includes an injector component according to the present invention, in particular an inner pole and/or an armature.

In addition, the present invention relates to a device for the galvanic coating of a component, in particular an injector component. The device includes a base plate having a multitude of feed-through openings, a sleeve being disposed in each feed-through opening. The sleeves are preferably made from a non-metallic material, in particular PTFE, PCTFE, PVDF, PVCC or a fluoroelastomer such as Viton. Moreover, the sleeve is preloaded, and the sleeve has an annular contact face, which radially projects toward the inside and on which the component to be coated is braced. In addition, the device includes a multitude of individual anodes, which are situated at a frontal end of the component to be coated. A multitude of flow channels are furthermore provided, one of the flow channels being allocated to a sleeve in each case and being configured for the through-flow of an electrolyte. This makes it possible to provide a coating on an end face of the component to be coated, while an outer edge of the component remains free of the coating due to the contact with the annular contact face. This furthermore ensures that a lateral surface of the component to be coated remains free of the coating as well.

The preloading of the sleeve is preferably achieved with the aid of a spring element, in particular an O-ring. Alternatively or additionally, the sleeve itself is produced from an elastic material and has intrinsic preloading.

When the preloading is achieved with the aid of a spring element, the spring element is preferably situated between the base plate of the device and a radially outwardly oriented step on the sleeve. This makes for a particularly compact device.

It is furthermore preferred that the individual anodes have a central pin, which projects into the component to be coated in each case. This makes it possible to coat also an inner lateral surface of an annular component to be coated.

Moreover, it is preferred to provide a shield, which is disposed in a base region of the central pin. The shield is also used for controlling the coating and for protecting each individual anode.

The device for the galvanic coating furthermore includes a cover, which is disposed above the multitude of sleeves and retains the multitude of sleeves between the cover and the base plate. In addition, the device preferably includes a holding device, in particular a magnetic holding device, in order to exert a holding force on the components to be coated in the direction of the annular contact face. The holding force may be provided with the aid of a magnetic repulsion and/or magnetic attraction, for instance.

The device is preferably provided in the form of an exchangeable cassette, which is able to be inserted into an electrolyte container.

In addition, the present invention relates to a method for producing an injector component having a coating. The present method includes the steps of providing the component and of placing the component in a device for galvanic coating such that an outer edge of the component to be coated sits on an annular contact face of the device. In this way, the edge of the component to be coated is covered by the annular contact face. In addition, a preloading force is exerted in the method according to the present invention, in such a way that the component to be coated is resting in a preloaded manner on the annular contact face. In a final step, coating of an end face of the injector component is carried out in such a way that the coating has a maximum, which lies at an outer half of a base body of the component, and an outer lateral surface of the base body remains free of the coating.

In the method according to the present invention, the injector component to be coated is preferably annular and has a central feed-through opening. The coating on the end face preferably extends to the end face, preferably up to an inner edge of the annular injector component.

In addition, according to the present method it is preferred that an inner lateral surface of the feed-through opening of the annular injector component is at least partially coated as well. Preferably, the entire inner lateral surface of the injector component is coated.

DETAILED DESCRIPTION

In the following text, an injector component 4, an injector 1 for introducing a fluid, and a device for coating injector component 4 as well as a coating method are described in detail with reference to FIGS. 1 through 6.

Figure 1:
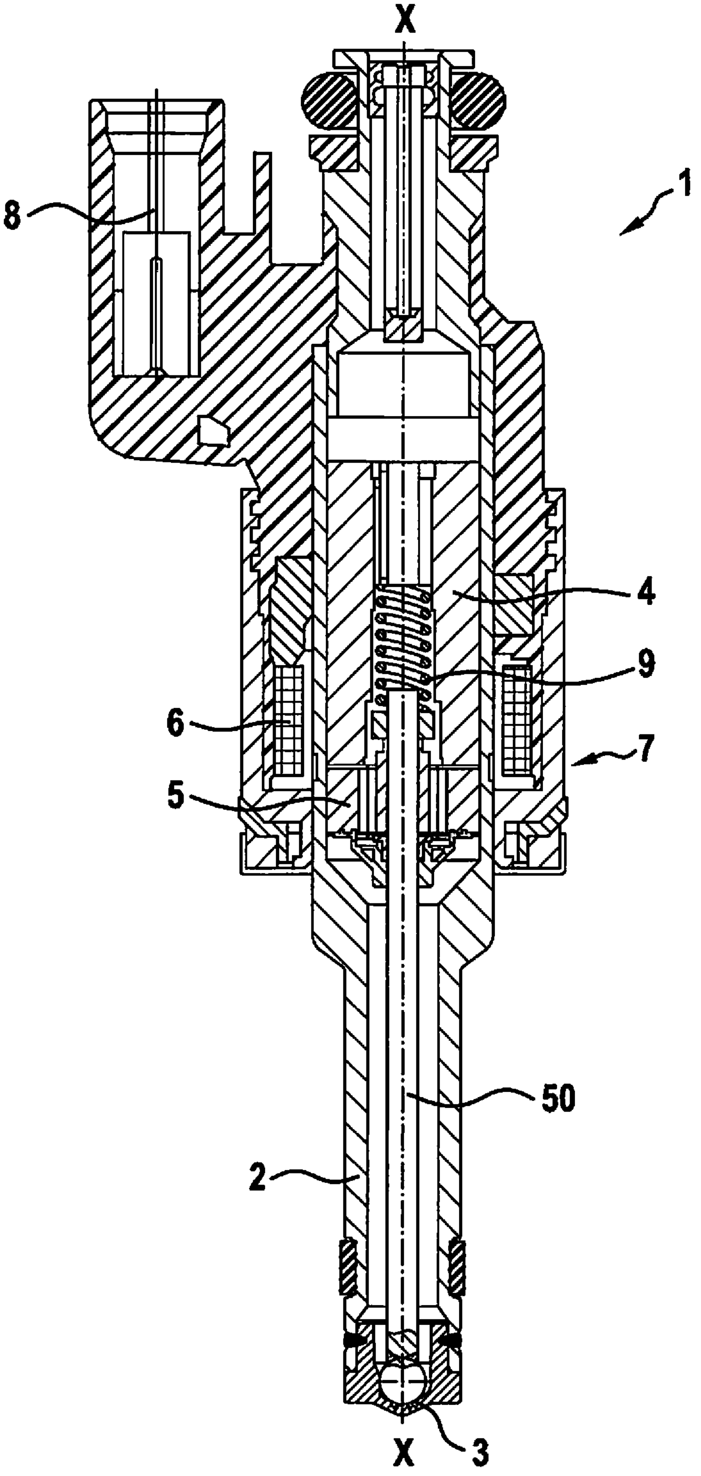
FIG. 1 shows a schematic sectional view of an injector having an injector component according to the present invention.

As may be gathered from FIG. 1, injector 1 includes a valve housing 2 and a valve seat 3. In this exemplary embodiment, the injector is an inwardly opening injector. In addition, the injector includes a closing element 50 in the form of a valve needle, as well as a restoring element 9, which retains closing element 50 in the closed position illustrated in FIG. 1.

Closing element 5 is activated with the aid of a solenoid actuator 7. An electrical connection is denoted by reference numeral 8.

Solenoid actuator 7 includes an inner pole 4, an armature 5, and a coil 6. A magnetic return is achieved via housing components. Armature 5 is firmly connected to closing element 50 in order to allow the closing element to move.

In this exemplary embodiment, the component of the solenoid actuator according to the present invention is inner pole 4. It can be seen in detail in FIG. 2. Inner pole 4 includes a sleeve-shaped base body 40, which has a central feed-through opening 46. A center axis X-X of inner pole 4 is simultaneously also a center axis of injector 1. Inner pole 4 has a coating 10 on a first end face 43 that points toward armature 5. Coating 10 is preferably a galvanic coating, and most preferably a chromium coating.

Due to its sleeve shape, base body 40 has an outer edge 44 and an inner edge 45 at first end face 43.

Figure 2:
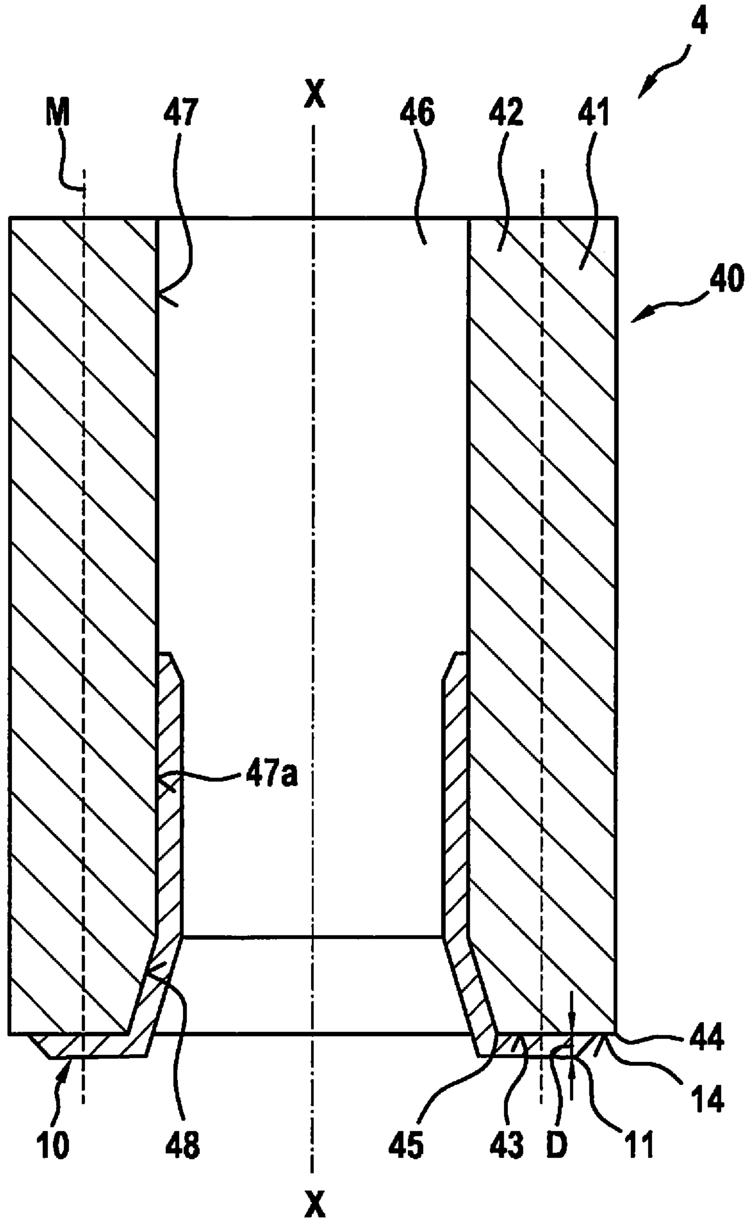
FIG. 2 shows a schematic sectional view of the injector component of FIG. 1.

As may be gathered from FIG. 2, sleeve-shaped base body 40 has a tapered region 48 at feed-through opening 46 at the end pointing in the direction of armature 5. The coating is provided both on first end face 43 and on tapered region 48 and a subregion **47*a* of inner side 47**.

Since inner pole 4 has the shape of a round cylinder, it has an imaginary center envelope line M, which is shown as a dashed line in FIG. 2. Envelope line M subdivides base body 40 into an outer ring half 41 and an inner ring half 42, a distance to the inner side and outer side of the base body being equal.

Figure 6:
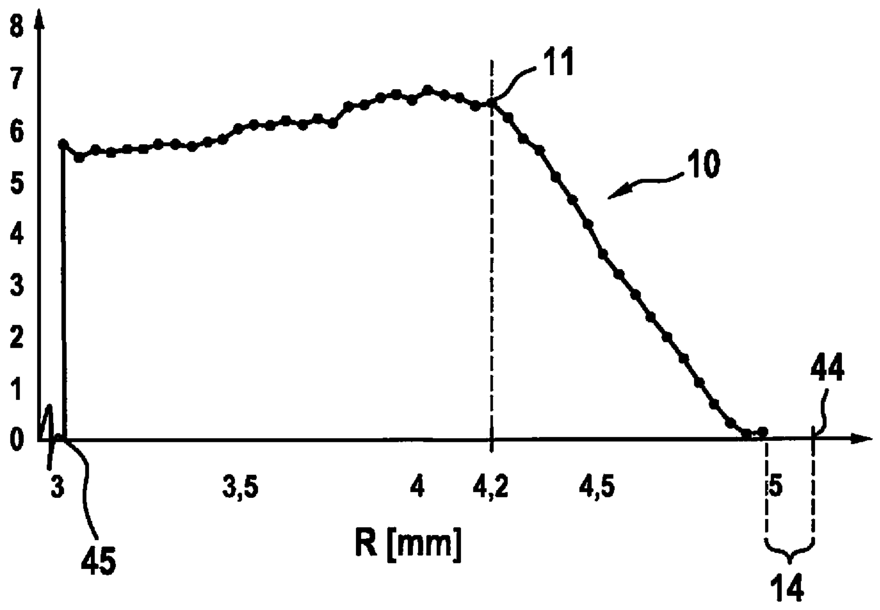
FIG. 6 shows a diagram, which shows a thickness of the coating on the end face of the injector component as a function of a radial position on the end face.

As is able to be gathered especially from FIG. 6, coating 10 provided on first end face 43 of inner pole 4 has an annular maximum 11. As illustrated in FIG. 2, maximum 11 is provided on outer ring half 41 of the base body. Coating 10 has a thickness D of 6.5 μm at maximum 11. As illustrated in FIG. 6, maximum 11 lies on a radius R of approximately 4.2 mm.

As may be gathered from an overall view of FIGS. 2 and 6, the coating on first end face 43 is provided in such a way that a coating-free annular region 14 is provided at an outer edge 44 and in a region directly adjoining outer edge 44 of the base body. Only then does coating 10 begin, which then increases up to maximum 11 with a rectilinear slope. Starting from maximum 11, the thickness of the coating then diminishes again toward inner edge 45 of the base body to a value of 5.5 μm.

As is able to be gathered directly from FIG. 6, the slopes of the coating on end face 43—starting from outer coating-free annular region 14 to maximum 11—are greater than the slope from inner edge 45 to maximum 11. This makes it possible to realize an annular maximum 11 at outer ring half 41 against which armature 5 of injector 1 is resting while in operation. An annular contact face thus results between the coating at maximum 11 and armature 5. Coating 10 makes it possible to achieve the highest dimensional accuracy of inner pole 4 at first end face 43.

As illustrated in FIG. 2, the coating thus extends from coating-free annular region 14 across remaining first end face 43 and tapered region 48 up to inner side 47 of feed-through opening 46. The height of the coating on inner side 47 depends on the height of a central pin 21 of an individual anode 20, which will be described in the following text in connection with the device for galvanic coating of inner pole 4.

Figure 3:
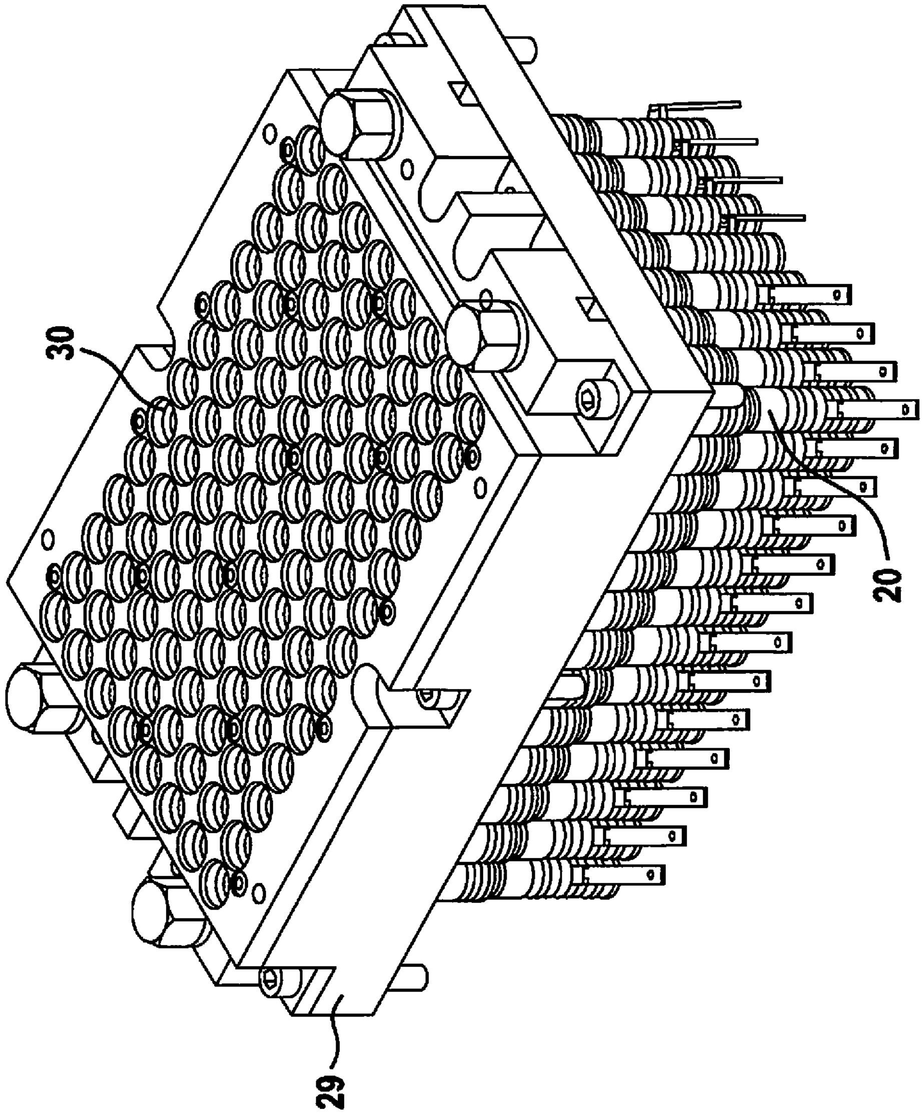
FIG. 3 shows a schematic, perspective view of a device for the galvanic coating of a multitude of injector components.
Figure 4:
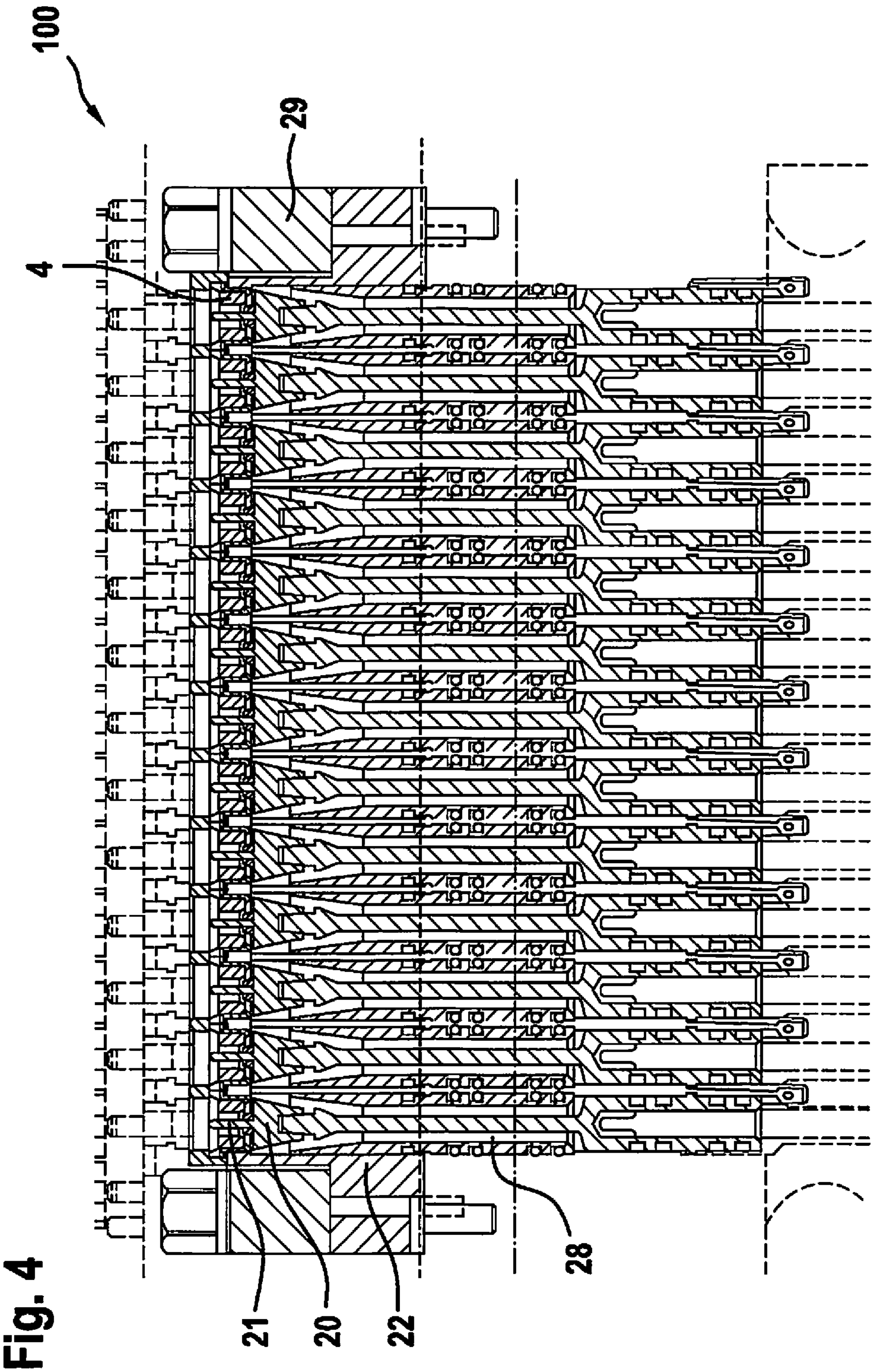
FIG. 4 shows a schematic sectional view of the device of FIG. 3.
Figure 5:
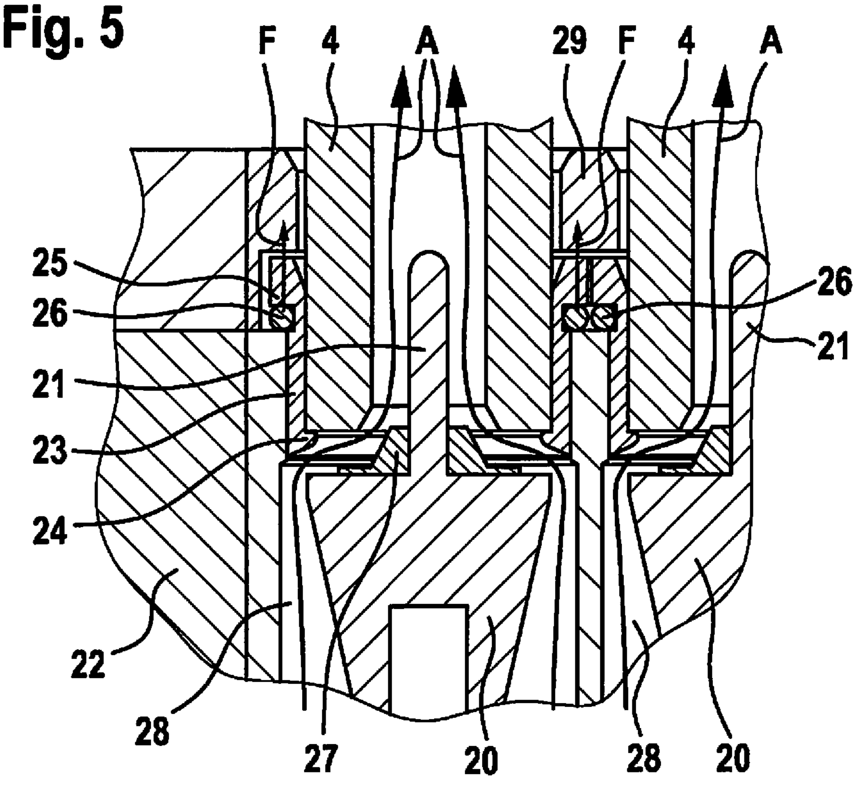
FIG. 5 shows a schematic, enlarged sectional view of the device of FIG. 3.

Device 100 for the galvanic coating of inner pole 4 is schematically illustrated in detail in FIGS. 3, 4, and 5. Device 100 includes a multitude of coating cells in order to allow for the simultaneous frontal coating of a multitude of inner poles 4. Device 100 encompasses a base plate 22 and a cover 29. Corresponding feed-through openings are developed in the base plate and in cover 29 in each case, which provide a flow channel 28 for an electrolyte. The flow through device 100 is schematically indicated by arrows A in FIG. 5. As is able to be gathered from FIG. 3, a multitude of openings 30 for the through-flow are developed in cover 29.

FIG. 5 shows an individual coating cell in detail, in which an inner pole 4 for coating is situated. Each coating cell includes a sleeve 23, which is situated in an opening in base plate 23 in an exchangeable manner.

Sleeve 23 has an annular contact face 24, which radially projects inwardly, as well as a radially outwardly directed step 25. Annular contact face 24 is set up to brace a subregion of first end face 43 of inner pole 4. The bracing takes place at outer edge 44 of the inner pole so that inner pole 4 is resting on coating-free annular region 14 on first end face 43.

In addition, device 100 includes a spring element 26 in the form of an O-ring. As is able to be gathered from FIG. 5, the O-ring is placed between base plate 22 and radially outwardly directed step 25 of sleeve 23. The O-ring is made from an elastomer and provides a preloading force F in order to achieve a direct contact of annular contact face 24 at first end face 43 of inner pole 4.

As may furthermore be gathered from FIG. 5, a shield 27 is provided above central pin 21 of individual anode 20. Shield 27 has the form of a small cap and covers regions of individual anode 20 with respect to the electrolyte. Device 100 is provided in the form of a coating cassette and is able to be inserted into and removed from an electrolyte bath. With the aid of device 100 according to the present invention, it can thus be reliably avoided that a coating of an outer lateral surface of inner pole 4 takes place anywhere. Due to the preloaded contact of inner pole 4 via first end face 43 at annular contact face 24, a deposition of coating particles on the coating-free annular region 14 on first end face 43 is avoided. It is thereby also avoided that an undesired coating on the outer lateral region of inner pole 4 takes place.

It should be noted that instead of spring element 26, it is also possible to use an elastic sleeve 23 or a combination, that is to say, an elastic sleeve 23 and a spring element 26. Due to the use of the multitude of individual anodes 20, it is moreover also possible to coat inner regions of the inner pole, if desired, up to any height, and in particular also completely. The geometrical dimensions of the individual anode 20 as well as of base plate 22 and cover 29 are selected in such a way that a uniform, laminar flow across the component to be coated is achievable during the coating process.

Another advantage of device 100 according to the present invention is that the various components 1 are able to be individually exchanged. This achieves a modularity, thereby allowing for a very simple development of device 100. Easy servicing or repair or an exchange of components that are subject to wear is also possible.

Device 100 may furthermore also include a holding device in the form of a magnetic holding device, so that inner poles 4 situated in sleeves 23 are kept in position.

In the method according to the present invention, it is therefore possible to coat an injector component in such a way that an outer edge of the injector component rests on an annular contact face 24 of device 100 in order to cover edge 44 and possibly also an outer annular region 14 of the injector component in an effort to prevent them from being coated. During the coating process, a preloading force 7 is exerted such that the injector component to be coated rests with preloading on annular contact face 24. This is preferably achieved with the aid of a spring element 26, in particular an elastic O-ring or the like, since this type of preloading is able to be provided in a very cost-effective manner. Through the exertion of preloading force F, it is reliably prevented that an outer lateral region of the injector component is coated. Coating of end face 43 of the injector component is then carried out in such a way that coating 10 has a maximum 11, which lies on an outer half of the injector component. Maximum 11 provides a linear contact with armature 5.

According to the present invention, it is therefore possible to provide injector components, in particular inner poles of a solenoid actuator, in a very cost-effective manner and—in a bulk production—with the highest accuracy and an annular maximum 11.

What is claimed is:

1. A device for a galvanic coating of a component, the device comprising:

- a base plate having a plurality of feed-through openings;
- a plurality of sleeves, wherein each respective one of the sleeves:
  - is situated in a respective one of the feed-through openings;
  - is preloaded in a first direction; and
  - includes an annular contact face that radially projects inwardly and on which a frontal end of the component to be coated can be braced with the frontal end facing the annular contact face in a second direction opposite to the first direction;
- a plurality of individual anodes, each respective one of the individual anodes being disposed with respect to a respective one of the sleeves so that, when the frontal end of the component to be coated is braced against the annular contact face of the respective sleeve, the respective individual anode is arranged at the frontal end of the component to be coated; and
- a plurality of flow channels, each respective one of the flow channels being allocated to a respective one of the sleeves and being configured for a through-flow by an electrolyte.

2. The device as recited in claim 1, further comprising spring elements, wherein the preloading of the sleeves is accomplished with the aid of the spring elements.

3. The device as recited in claim 2, wherein the spring elements are O-rings.

4. The device as recited in claim 1, wherein the sleeves are made from an elastic material and the preloading of the sleeves is by an intrinsic preloading of the sleeves by an installation of the sleeves in the device.

5. The device as recited in claim 1, further comprising:
a cover having a multitude of feed-through openings, wherein:
a number of the feed-through openings of the cover corresponds to a number of the plurality of feed-through openings of the base plate; and
the cover is disposed above the plurality of sleeves and retains the sleeves between the cover and the base plate.

6. The device as recited in claim 1, further comprising a holding device in order to exert on the component to be coated a holding force that holds the component in a respective one of the sleeves into which the component is inserted.

7. The device as recited in claim 1, wherein the component is an injector component.

8. A device for a galvanic coating of a component, the device comprising:
a base plate having a plurality of feed-through openings;
a plurality of sleeves, wherein:
each respective one of the sleeves is situated in a respective one of the feed-through openings; and
each of the sleeves includes an annular contact face that radially projects inwardly and on which a frontal end of the component to be coated can be braced;
a plurality of individual anodes, each respective one of the individual anodes being arranged with respect to a respective one of the sleeves so that, when the frontal end of the component to be coated is braced against the annular contact face of the respective sleeve, the respective individual anode is arranged at the frontal end of the component to be coated;
a plurality of flow channels, each respective one of the flow channels being allocated to a respective one of the sleeves and being configured for a through-flow by an electrolyte; and
for each of the plurality of sleeves, a respective spring element that (i) preloads the respective sleeve and (ii) is situated between the base plate and a radially outwardly oriented step of the respective sleeve.

9. A device for a galvanic coating of a component, the device comprising:
a base plate having a plurality of feed-through openings;
a plurality of sleeves, wherein:
each respective one of the sleeves is situated in a respective one of the feed-through openings;
a preloading of the sleeves is able to be implemented; and
each of the sleeves includes an annular contact face that radially projects inwardly and on which a frontal end of the component to be coated can be braced;
a plurality of individual anodes, wherein each respective one of the individual anodes:
has a central pin; and
is arranged with respect to a respective one of the sleeves so that, when the frontal end of the component to be coated is braced against the annular contact face of the respective sleeve, the respective individual anode is arranged at the frontal end of the component to be coated, with the respective central pin of the respective individual anode projecting into the component to be coated; and
a plurality of flow channels, each respective one of the flow channels being allocated to a respective one of the sleeves and being configured for a through-flow by an electrolyte.

10. The device as recited in claim 9, further comprising respective shields situated in respective base regions of respective ones of the central pins.

11. A device for a galvanic coating of a component, comprising:
a base plate having a plurality of feed-through openings;
a plurality of sleeves, wherein:
each respective one of the sleeves is situated in a respective one of the feed-through openings;
a preloading of the sleeves is able to be implemented; and
each of the sleeves includes an annular rim that radially projects inwardly and a first side of which forms an annular contact face on which a frontal end of the component to be coated can be braced;
a plurality of individual anodes, each respective one of the individual anodes being arranged so that (i) at least a portion of the respective anode is arranged at a second side of the annular rim of a respective one of the sleeves and (ii) when the frontal end of the component to be coated is braced against the annular contact face of the respective sleeve, the respective individual anode is arranged in front of the frontal end of the component to be coated; and
a plurality of flow channels, each respective one of the flow channels being allocated to a respective one of the sleeves and being configured for a through-flow by an electrolyte.

12. A method for coating a component, the method comprising:
providing the component;
placing the component in a device, wherein:
(I) the device includes:
(i) a base plate having a plurality of feed-through openings;
(ii) a plurality of sleeves, each respective one of the sleeves:
being situated in a respective one of the feed-through openings;
being able to be preloaded; and
including an annular contact face that radially projects inwardly and on which a frontal end of the component can be braced;
(iii) a plurality of individual anodes, each respective one of the individual anodes being arranged with respect to a respective one of the sleeves so that, when the frontal end of the component is braced against the annular contact face of the respective sleeve, the respective individual anode is arranged at the frontal end of the component to be coated; and
(iv) a plurality of flow channels, each respective one of the flow channels being allocated to a respective one of the sleeves and being configured for a through-flow by an electrolyte;
(II) the device has at least one of the following four features (i)-(iv):
(i) the device further comprises, for each of the plurality of sleeves, a respective spring element that (a) preloads the respective sleeve and (b) is situated between the base plate and a radially outwardly oriented step of the respective sleeve;

(ii) each of the anodes has a respective central pin that, when the frontal end of the component is braced against the annular contact face of the respective sleeve, projects into the component;

(iii) each of the sleeves is preloaded in a first direction and is arranged so that the frontal end of the component can be braced on the annular contact face with the frontal end facing the annular contact face in a second direction opposite to the first direction; and (iv) the annular contact face is formed by a first side of an annular rim of the respective sleeve, and each respective one of the individual anodes is arranged so that (a) at least a portion of the respective anode is arranged at a second side of the annular rim of a respective one of the sleeves and (b) when the frontal end of the component is braced against the annular contact face of the respective sleeve, the respective individual anode is arranged in front of the frontal end of the component to be coated; and (III) the placement of the component in the device is in such a way that an outer edge of the component rests on one of the annular contact faces of the device in order to cover the outer edge of the component so as to avoid coating of the outer edge of the component;

exerting a preloading force such that the component to be coated rests in a preloaded manner on the respective annular contact face; and coating a first end face of the component in such a way that the coating has a maximum that lies on an outer half of the component and no coating is present on an outer lateral surface of the component.

13. The method as recited in claim 12, wherein:

the component is annular with a central feed-through opening; and the coating reaches up to an inner edge of the component.

14. The method as recited in claim 13, wherein an inner lateral surface of the feed-through opening of the component is at least partially coated.

* * * * *